United States Patent
Smith et al.

(10) Patent No.: US 7,051,862 B1
(45) Date of Patent: May 30, 2006

(54) CONVEYOR BELT CLEANER ASSEMBLY INCLUDING SCALPER BLADE

(75) Inventors: Christopher Scott Smith, Barboursville, WV (US); Richard Davis Stoll, Chesapeake, OH (US); Glenn Edward Farrow, Huntington, WV (US)

(73) Assignee: Richwood Industries, Inc., Huntington, WV (US)

( * ) Notice: Subject to any disclaimer, the term of this patent is extended or adjusted under 35 U.S.C. 154(b) by 0 days.

(21) Appl. No.: 11/015,656

(22) Filed: Dec. 17, 2004

(51) Int. Cl.
*B65G 45/16* (2006.01)

(52) U.S. Cl. .................................. 198/499; 198/497
(58) Field of Classification Search ................ 198/497, 198/499
See application file for complete search history.

(56) References Cited

U.S. PATENT DOCUMENTS

| | | | |
|---|---|---|---|
| 4,257,517 A * | 3/1981 | MacPherson et al. ........ | 198/497 |
| 4,694,952 A | 9/1987 | Meijer | |
| 4,872,416 A | 10/1989 | Daniel et al. | |
| 4,925,434 A | 5/1990 | Swinderman et al. | |
| 4,962,845 A | 10/1990 | Gibbs | |
| 4,969,553 A | 11/1990 | Stoll | |
| 5,016,746 A | 5/1991 | Gibbs | |
| 5,082,106 A | 1/1992 | Schwarze | |
| 5,114,000 A | 5/1992 | Rappen | |
| 5,197,587 A * | 3/1993 | Malmberg .................. | 198/497 |
| 5,301,797 A | 4/1994 | Hollyfield, Jr. | |
| 5,339,947 A * | 8/1994 | Campanile .................. | 198/499 |
| 5,373,931 A | 12/1994 | Barnes et al. | |
| 5,378,202 A | 1/1995 | Swinderman | |
| 5,573,102 A * | 11/1996 | Puchalla .................... | 198/497 |
| 5,845,761 A * | 12/1998 | Davidts et al. ............. | 198/499 |
| 5,975,281 A | 11/1999 | Yoshizako et al. | |
| 6,056,112 A * | 5/2000 | Wiggins ..................... | 198/499 |
| 6,082,524 A | 7/2000 | Brink | |
| 6,152,290 A | 11/2000 | Mott et al. | |
| 6,179,114 B1 | 1/2001 | Brink | |
| 6,182,816 B1 * | 2/2001 | Gibbs et al. ................ | 198/497 |
| 6,227,350 B1 | 5/2001 | Yoshizako et al. | |
| 6,279,727 B1 | 8/2001 | Waalkes et al. | |
| 6,283,274 B1 | 9/2001 | Dolan et al. | |
| 6,315,105 B1 | 11/2001 | Gibbs et al. | |
| 6,321,901 B1 | 11/2001 | Strebel et al. | |
| 6,349,816 B1 | 2/2002 | Tenzer et al. | |
| 6,354,428 B1 | 3/2002 | Gibbs et al. | |
| 6,360,875 B1 | 3/2002 | Altemus, Jr. et al. | |
| 6,401,911 B1 | 6/2002 | Swinderman | |
| 6,439,373 B1 * | 8/2002 | Swinderman ............... | 198/499 |
| 6,443,294 B1 | 9/2002 | Brody et al. | |
| 6,457,575 B1 | 10/2002 | Swinderman | |
| 6,575,292 B1 | 6/2003 | Swinderman | |
| 6,581,754 B1 | 6/2003 | Law | |
| 6,591,969 B1 | 7/2003 | Swinderman et al. | |
| 6,612,419 B1 | 9/2003 | Watson | |
| 6,619,469 B1 | 9/2003 | Malmberg | |
| 6,681,919 B1 | 1/2004 | Brink | |

* cited by examiner

Primary Examiner—Douglas Hess
(74) Attorney, Agent, or Firm—Stevens & Showalter LLP

(57) ABSTRACT

A scalper blade assembly for cleaning a conveyor belt. The assembly includes an adjustment structure for adjusting a force applied against the blades for biasing the blades into engagement with the conveyor belt. The adjustment structure includes a ratchet mechanism for incrementally adjusting the biasing force and a clamping structure for maintaining the position of blades and resisting forces applied against the blades from the conveyor. In addition, a blade support assembly is provided for facilitating mounting and replacement of scalper blades. The support assembly includes a support member and a locking member located within the support member, where movement of the locking member relative to the support member is operable to engage and disengage engagement members associated with the blades in locking engagement with the support member.

5 Claims, 8 Drawing Sheets

CONVEYOR BELT CLEANER ASSEMBLY INCLUDING SCALPER BLADE

BACKGROUND OF THE INVENTION

1. Field of the Invention

The present invention relates in general to material handling conveyors and, more particularly, to a construction for providing scalper blades located in engagement against a conveyor belt for cleaning debris from the conveyor belt.

2. Description of Related Technology

Transportation of a materials, such as materials in a mining operation, is often accomplished through use of a conveyor belt system. In use, material is loaded on the conveyor belt at a loading location and the conveyor belt carries the material to another location where the material is unloaded. During this process, some of the material may adhere to or otherwise accumulate on the surface of the conveyor belt, resulting in the material being carried back to the loading location. In being carried back, the material may drop off the conveyor, resulting in an undesirable accumulation of debris beneath the conveyor, or may remain adhered to the conveyor, potentially interfering with the continued operation of the conveyor. Accordingly, scalper blades are often located at the discharge end of the conveyor in order to scrape debris from the belt as the belt passes down to the return run of the conveyor.

Typically, the blades are formed of a polymer material, such as urethane or polyurethane, and therefor provide a degree of resiliency for permitting irregularities in the belt, such as splices, to pass while also engaging and removing debris. A mounting structure may be provided for the blades where the mounting structure is movably supported to bias the blades against the belt, and to reposition the blade edges as the blades wear down in order to maintain the blades in contact with the belt. In addition, the blades may be replaced when the blades have worn to the end of their useful life. Generally, the conveyor system must be taken out of operation for a period of time in order to perform servicing operations including adjustment and replacement of the blades. Accordingly, it is desirable to provide a scalper blade system in which the system adjustments are readily performed, and which provides for efficient replacement of the blades, while minimizing downtime to the conveyor system.

SUMMARY OF THE INVENTION

In one aspect of the invention, a scalper blade is provided for mounting on a scalper blade assembly including a support member defining a support surface and passages for supporting the scalper blade in engagement with a conveyor belt, the scalper blade comprising a body portion formed of an elastomeric material, and comprising an upper portion and a lower portion; the lower portion defining a base for the scalper blade, and including a rigid plate located within the lower portion; and at least one elongate engagement member extending through a lower surface of the lower portion and rigidly attached to the rigid plate for engagement in at least one passage in a support member.

Other features and advantages of the invention will be apparent from the following description, the accompanying drawings and the appended claims.

DETAILED DESCRIPTION OF THE INVENTION

Figure 1:
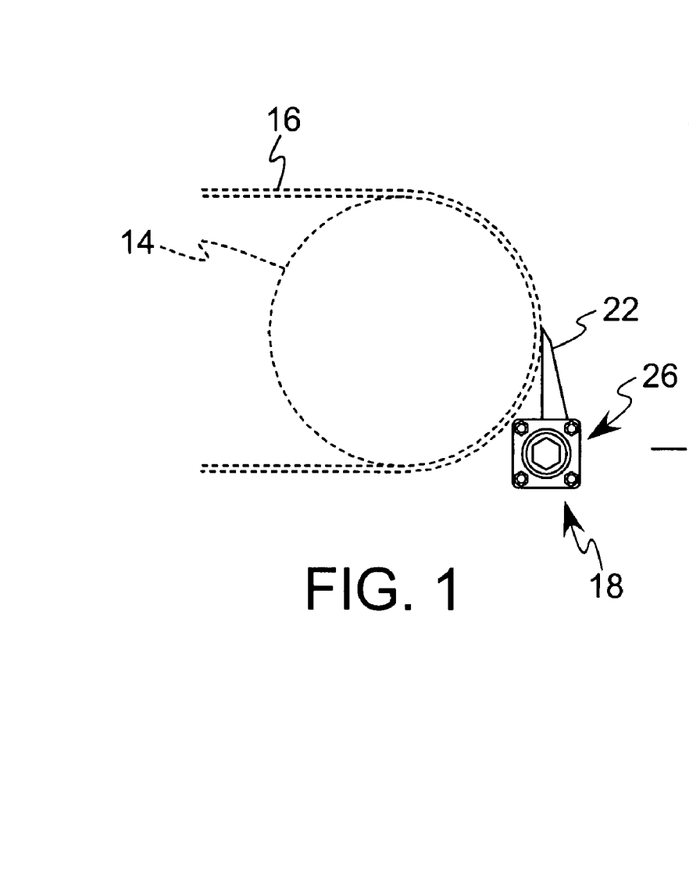
FIG. 1 is a side elevational view of the discharge end of a conveyor system including a scalper blade assembly constructed in accordance with the present invention.
Figure 2:
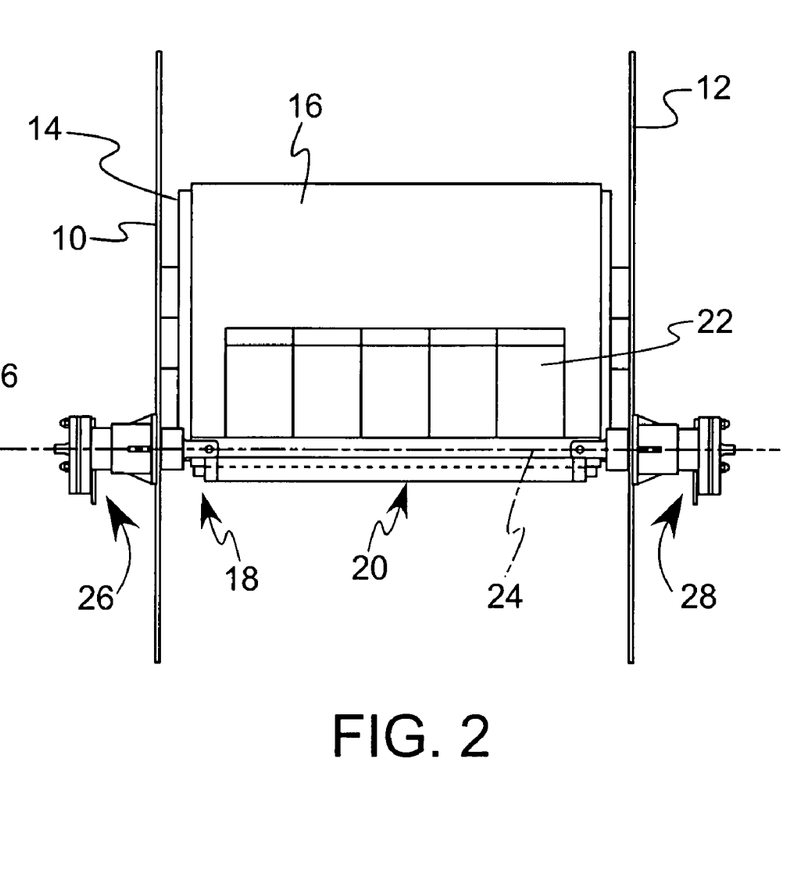
FIG. 2 is an end elevational view of the conveyor system illustrated in FIG. 1.

Referring to FIGS. 1 and 2, an end portion of a material handling conveyor is illustrated including a pair of side plates 10, 12 mounting a conveyor roller 14 for supporting a discharge end portion of a conveyor belt 16. A scalper blade assembly 18 is also mounted on the side plates 10, 12 at a location adjacent the conveyor belt 16 for engaging the conveyor belt at a location approximately midway between the top and bottom of the conveyor roller 14, i.e., a three o'clock position as seen in FIG. 1. The scalper blade assembly 18 is provided to remove debris from the discharge end of the conveyor belt 16 and prevent or reduce the carry-back of material along the lower run of the conveyor belt 16.

Figures 3, 3A:
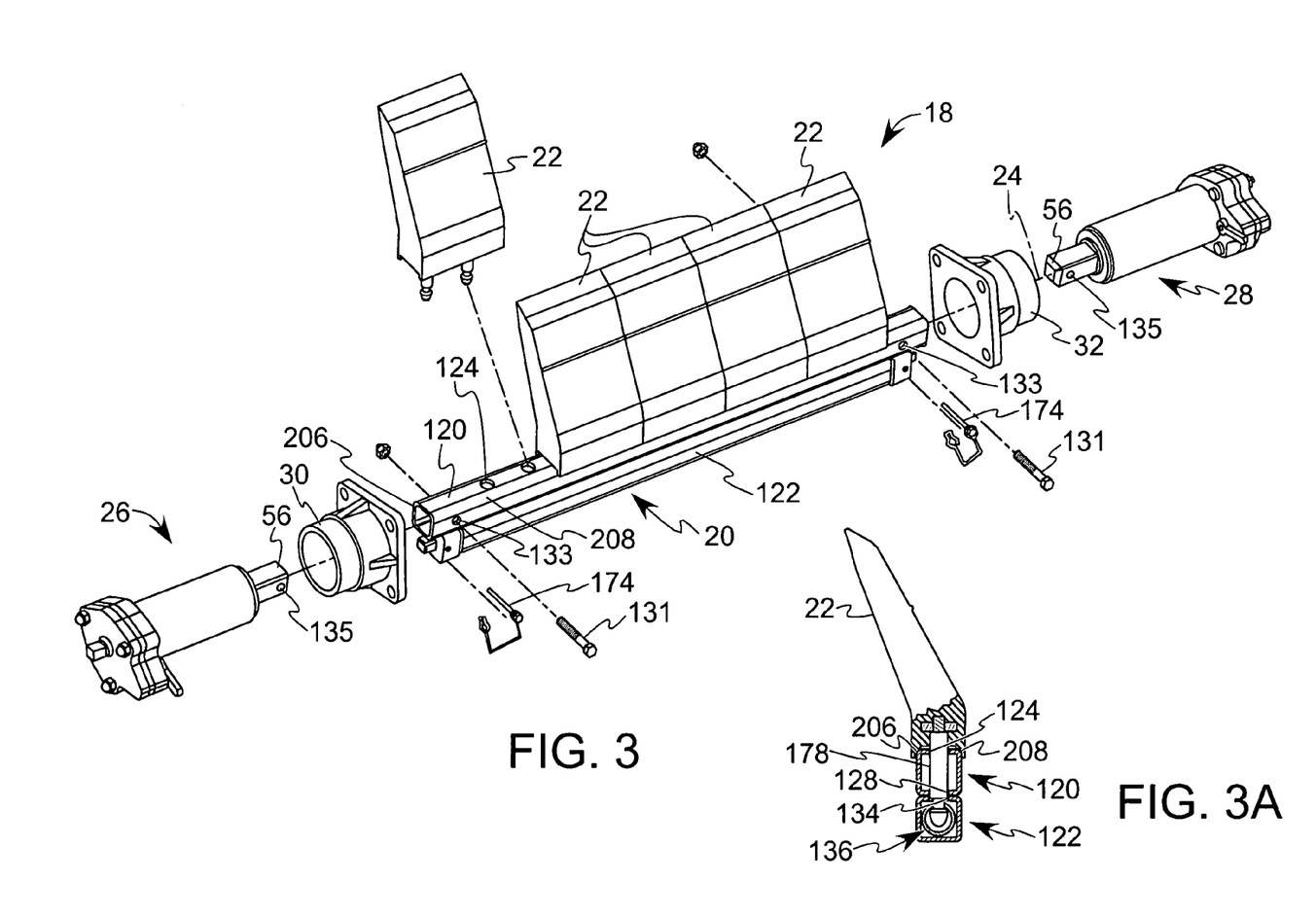
FIG. 3A is cross-sectional view of the scalper blade assembly.
FIG. 3 is a partially exploded view of a scalper blade assembly constructed in accordance with the present invention.

Referring additionally to FIG. 3, the scalper blade assembly 18 comprises a blade support member 20, illustrated as supporting a plurality of scalper blades 22. The blade support member 20 is illustrated as an elongate member, and is supported for rotation about an elongate axis 24 of the blade support member 20 by a blade tension adjustment assembly, including adjustment units 26, 28. The adjustment units 26, 28 are substantially similar units located at opposing ends of the blade support member 20 for providing an incrementally adjustable rotational position of the blade support member 20 and for providing a biasing tension to the scalper blades 22, and are supported on the side plates 10, 12 by respective mounting sleeves 30, 32.

Figure 4:
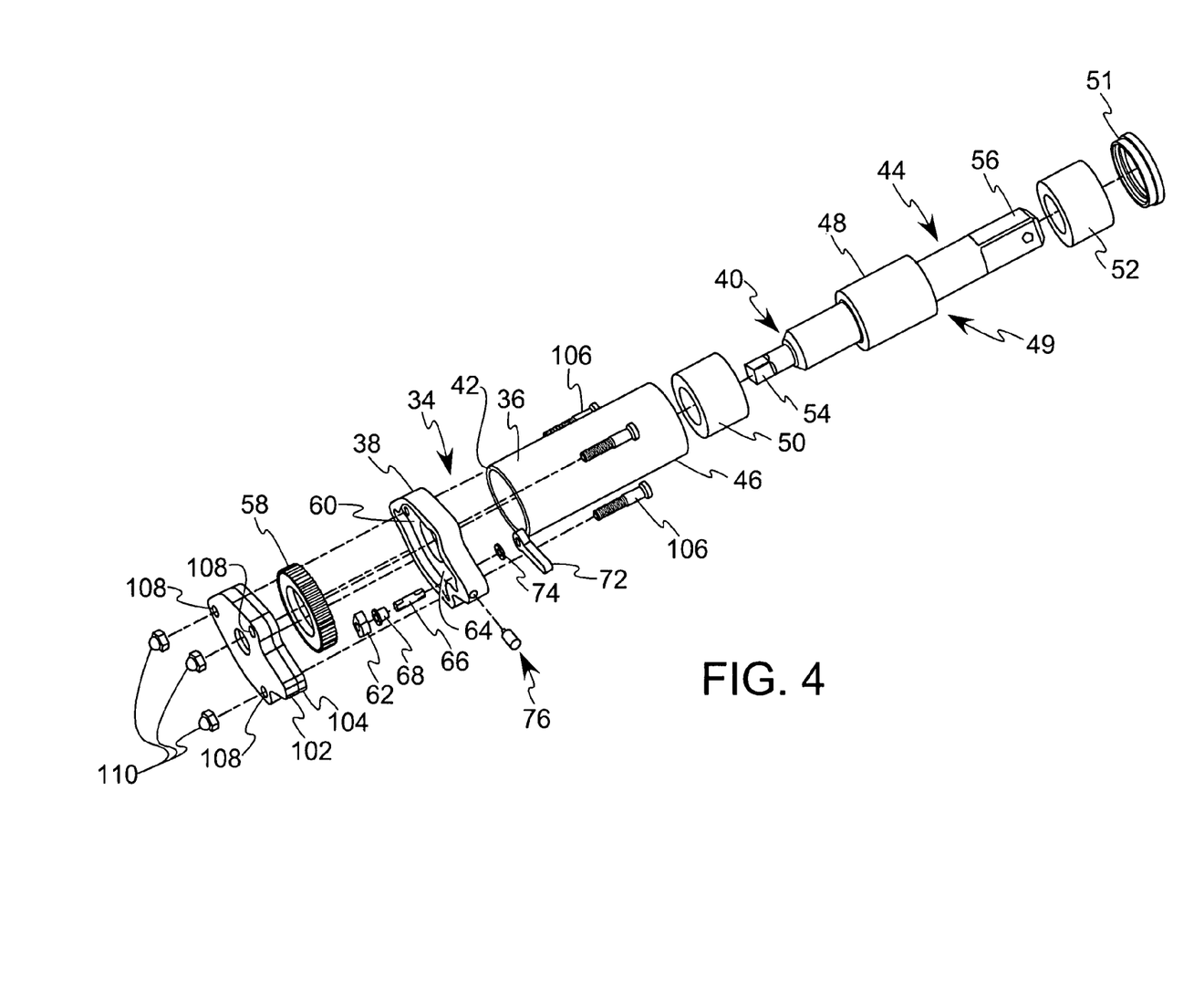
FIG. 4 is an exploded view of an adjustment unit for the scalper blade assembly.
Figure 5:
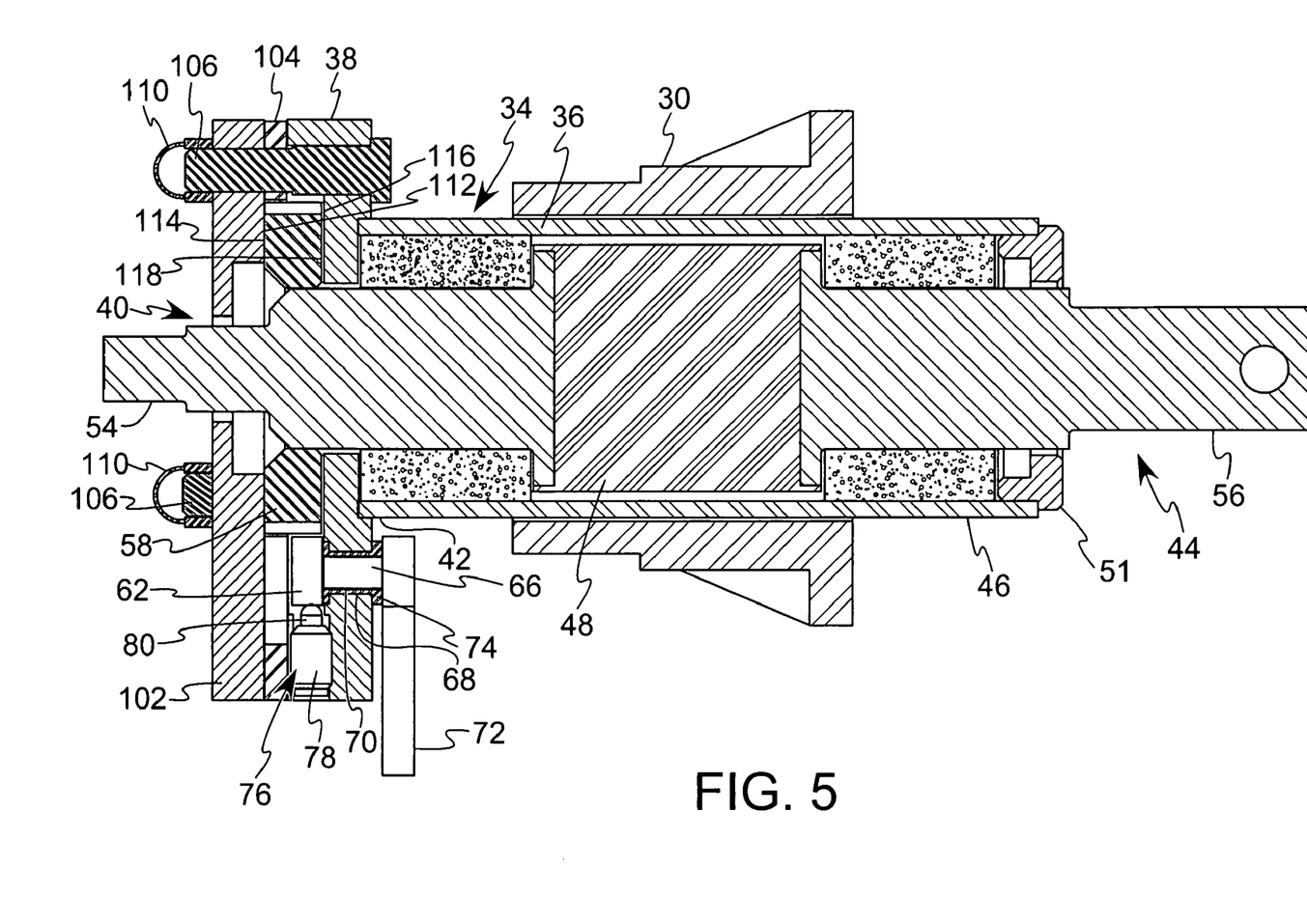
FIG. 5 is a cross-sectional view of the adjustment unit for the scalper blade assembly.

Referring to FIGS. 4 and 5, the adjustment unit 26 is illustrated, it being understood that the adjustment unit 28 is of substantially similar construction, including components corresponding to those described below for the unit 26. The adjustment unit 26 comprises a housing 34 including an actuator tube 36, and a gear plate 38 rigidly attached to the actuator tube 36. An input shaft 40 extends through a first end 42 of the housing 34, and an output shaft 44 extends through a second end 46 of the housing 34 and is coupled to the input shaft by a resilient coupling 48, preferably comprising a rubber coupling having a Shore A hardness of approximately 40 to 45. The input shaft 40, coupling 48 and output shaft 44 form a tensioning assembly 49. In addition, an end seal 51 comprising a rubber seal is located on the second end 46 for closing off the housing 34 and preventing entry of contaminants into the housing.

The input and output shafts 40, 44 are supported for rotatable movement within the actuator tube 36 by respective bushings 50, 52, preferably comprising bushings formed of an ultra high molecular weight polyethylene (UHMWPE) material. The input shaft 40 includes an input end 54 formed with a non-circular shape, such as a square shape, for engagement with a tool (not shown) for applying a torque force to the input shaft 40. Torque force from the input shaft 40 is transmitted through the coupling 48 to the output shaft 44 and to the blade support member 20 supported on an output end 56 of the output shaft 44. The output end 56 of the output shaft is formed with a non-circular shape, such as a square shape for cooperating with an opening of corresponding shape in the blade support member 20. Engagement of the blades 22 against the conveyor belt 16 operates to resist rotation of the blade support member 20 toward the conveyor belt 16, such that a resilient tension force is produced in the coupling member 48, which operates to maintain a biasing force against the blades 22.

The adjustment unit 26 is provided with a tension mechanism which is housed within the gear plate 38. A gear 58 is rigidly fixed to the input shaft 40 and is located within a gear recess 60 of the gear plate 38. A pawl 62 is located in a pawl recess 64 in the gear plate 38 and is supported on an actuator pin 66 extending through a bushing 68 in a passage 70 of the gear plate 38. An outer end of the actuator pin 66 supports a pawl positioning lever 72 which is located against a spacing washer 74 for pivotal movement relative to the gear plate 38. Pivotal movement of the positioning lever 72 moves the pawl 62 to one of a plurality of selectable positions relative to the gear 58. A spring plunger 76 is mounted in the gear plate 38 and includes a casing 78 and a resiliently biased plunger portion 80 extending into the pawl recess 64 for engagement with a cam side of the pawl 62.

Figure 6:
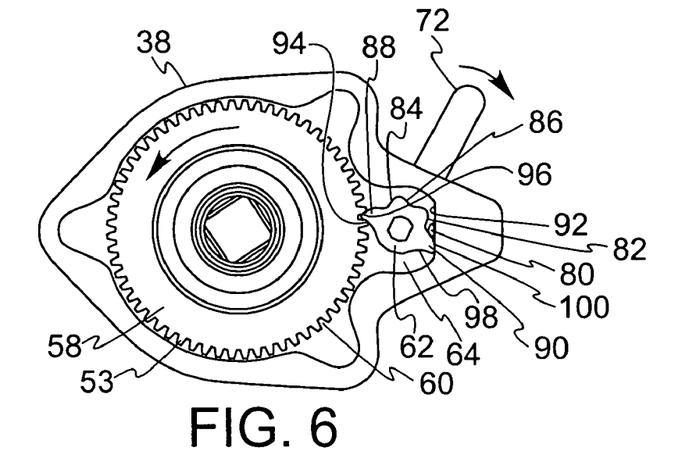
FIGS. 6–8 are interior views of the gear plate portion of the adjustment unit illustrating three positions of the pawl for engaging the gear of the adjustment unit.
Figure 7:
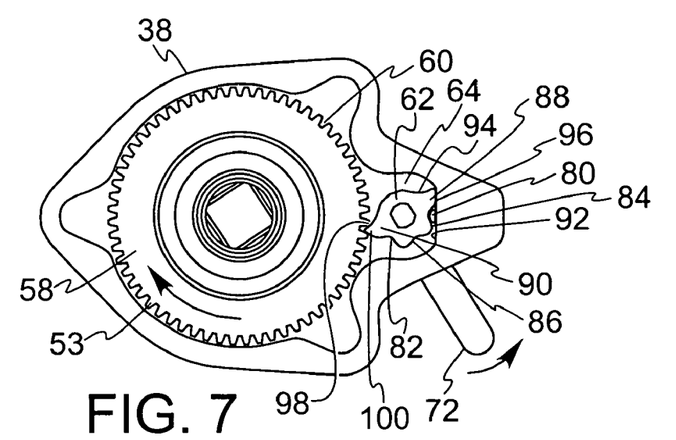
Figure 8:
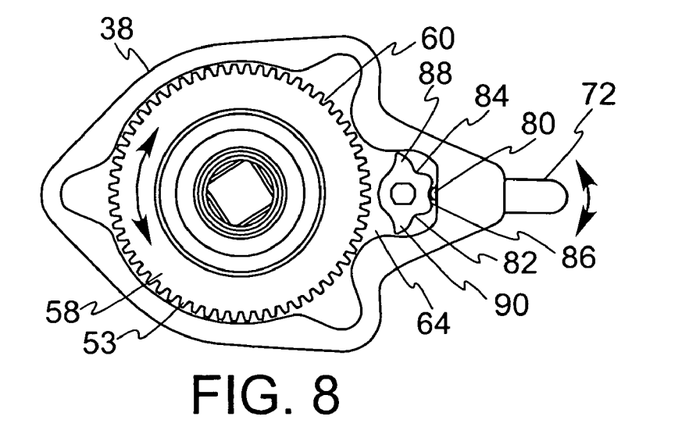

Referring to FIGS. 6–8, the spring plunger 76 operates to locate the pawl 62 in one of three positions for controlling rotation of the gear 58 and the associated tensioning assembly 49 formed by the input shaft 40, coupling 48 and output shaft 44. The pawl 62 includes a first cam detent area 82, a second cam detent area 84 and a third cam detent area 86 for engagement with the plunger portion 80 of the spring plunger 76. When the lever 72 is pivoted to locate the first cam detent area 82 in engagement with the plunger portion 80, a first pawl tooth 88 is located in engagement with the teeth 53 of the gear 58, and a second pawl tooth 90 is located adjacent a stop wall 92 located at one side of the pawl recess 64. The pawl 62 rotates in the clockwise direction, as seen in FIG. 6, when a force is applied to rotate the gear 58 in a forward counterclockwise direction, with the second pawl tooth 90 moving in a direction away from the stop wall 92 to permit the first pawl tooth 88 to move away from the gear 58 in a ratcheting action as the gear 58 rotates. The first pawl tooth 88 includes a curved or ramp-like surface 94 for facilitating movement of the gear teeth 53 past the first pawl tooth 88 during rotation of the gear 58 in the forward direction. When a force is applied to rotate the gear 58 in a reverse clockwise direction, a stop surface 100 on the second pawl tooth 90 engages against the stop wall 92 and a stop surface 96 on the first pawl tooth 88 engages against the gear teeth 53 to prevent rotation of the gear 58 in the reverse direction.

FIG. 7 illustrates the pawl position with the lever 72 positioned in a reverse position to locate the second cam detent area 84 engaged with the plunger portion 80, such that the second pawl tooth 90 is located in engagement with the teeth 53 of the gear 58, and the first pawl tooth 88 is located adjacent the stop wall 92. The pawl 62 rotates in the counterclockwise direction, as seen in FIG. 7, when a force is applied to rotate the gear 58 in the reverse clockwise direction, with the first pawl tooth 88 moving in a direction away from the stop wall 92 to permit the second pawl tooth 90 to move away from the gear 58 in a ratcheting action as the gear 58 rotates. The second pawl tooth 90 includes a curved or ramp-like surface 98 for facilitating movement of the gear teeth 53 past the second pawl tooth 90 during rotation of the gear in the reverse direction. When a force is applied to rotate the gear 58 in the forward counterclockwise direction, the stop surface 96 of the first pawl tooth 88 engages against the stop wall 92 and the stop surface 100 on the second pawl tooth 90 engages against the gear teeth 53 to prevent rotation of the gear 58 in the forward direction. In the positions of the pawl 62 illustrated in FIGS. 6 and 7, the plunger portion 80 cooperates with the respective cam detent areas 82, 84 to resiliently maintain the pawl 62 in the selected position while permitting limited pivoting movement of the pawl 62 in response to passage of the gear teeth 53 during unidirectional ratcheting movement of the gear 58.

FIG. 8 illustrates a neutral position of the lever 72 to position the third cam detent area 86 in engagement with the plunger portion 80. In the neutral position, both the first and second pawl teeth 88, 90 are located out of engagement with the gear 58, such that the gear 58 and associated tensioning assembly 49 may freely rotate in either direction.

It should be noted that in the above-described adjustment structure, other elements equivalent to the gear 58 and pawl 62 may be provided, such as member including detent areas or other structure for engaging with the pawl 62 or a similar element.

Referring to FIGS. 4 and 5, the gear recess 60 and pawl recess 64 in the gear plate 38 are covered by a clamping plate 102, with a rubber seal 104 located between the gear plate 38 and the clamping plate 102. Threaded studs 106 are rigidly fastened in the gear plate 38 and extend through apertures 108 in the clamping plate 102, and the clamping plate 102 is held in position by nuts 110 engaged on the ends of the studs 106.

During a blade tensioning operation, the end 54 of the input shaft 40 is rotated in an appropriate direction, such as counterclockwise as viewed in FIG. 6, to pivot the blade support member 20 in a direction to bias the blades 22 against the conveyor belt 16 with a desired tension. In such a tensioning operation, the lever 72 is positioned in the forward tension position to engage the first pawl tooth 88 with the teeth 53 of the gear 58. In addition, during the tensioning operation, the nuts 110 are loosely engaged on the ends of the studs 106 such that the clamping plate 102 and seal 104 are loosely engaged adjacent the gear plate 38.

When the gear 58 has been rotated to obtain the desired tensioning force biasing the blades 22 against the conveyor belt 16, the nuts 110 are tightened to cause an inner surface 112 of the clamping plate 102 to frictionally engage and press against a front face 114 of the gear 58 to press a rear face 116 of the gear 58 against an inner surface 118 of the gear recess 60. Accordingly, the gear 58 is clamped between the clamping plate 102 and the gear plate 38 to clamp the position of the input shaft 40 such that during operation of the blades 22 to scape debris from the conveyor belt 16, shock forces from the blade support 20 will be transferred through the tensioning assembly 49 to the gear 58 and directly from the gear 58 to the housing 34 of the adjustment unit 26. Thus, the adjustment unit 26 comprises two locating mechanisms in which one provides for incremental adjustment of tension on the blades 22 and the other provides a locking function for maintaining the selected adjustment position. In this manner, the pawl 62 and cooperating teeth 53 of the gear 58 are relieved of carrying a substantial portion of forces imparted to the blades 22 and transmitted between the support member 20 and the housing 34.

It should be understood that substantially identical adjustment units 26 and 28 may be provided on either side of the support member 20 for exerting a biasing force to tension the blades 22 against the conveyor belt 16. For example the adjustment unit 26 may be provided on the left side of the conveyor belt 16 and the substantially identical second unit 28 may be provided on the right side of the conveyor 16. However, the positions of the lever 72 for forward and reverse rotation of the gear 58 in the second unit 28 will be reversed, such that the lever 72 will be moved to engage the plunger portion 80 in the second cam detent area 84 for rotation in a forward direction for tensioning the blades 22, and to engage in the first cam detent area 82 to provide ratcheting movement of the gear 58 in the reverse direction.

Figure 9:
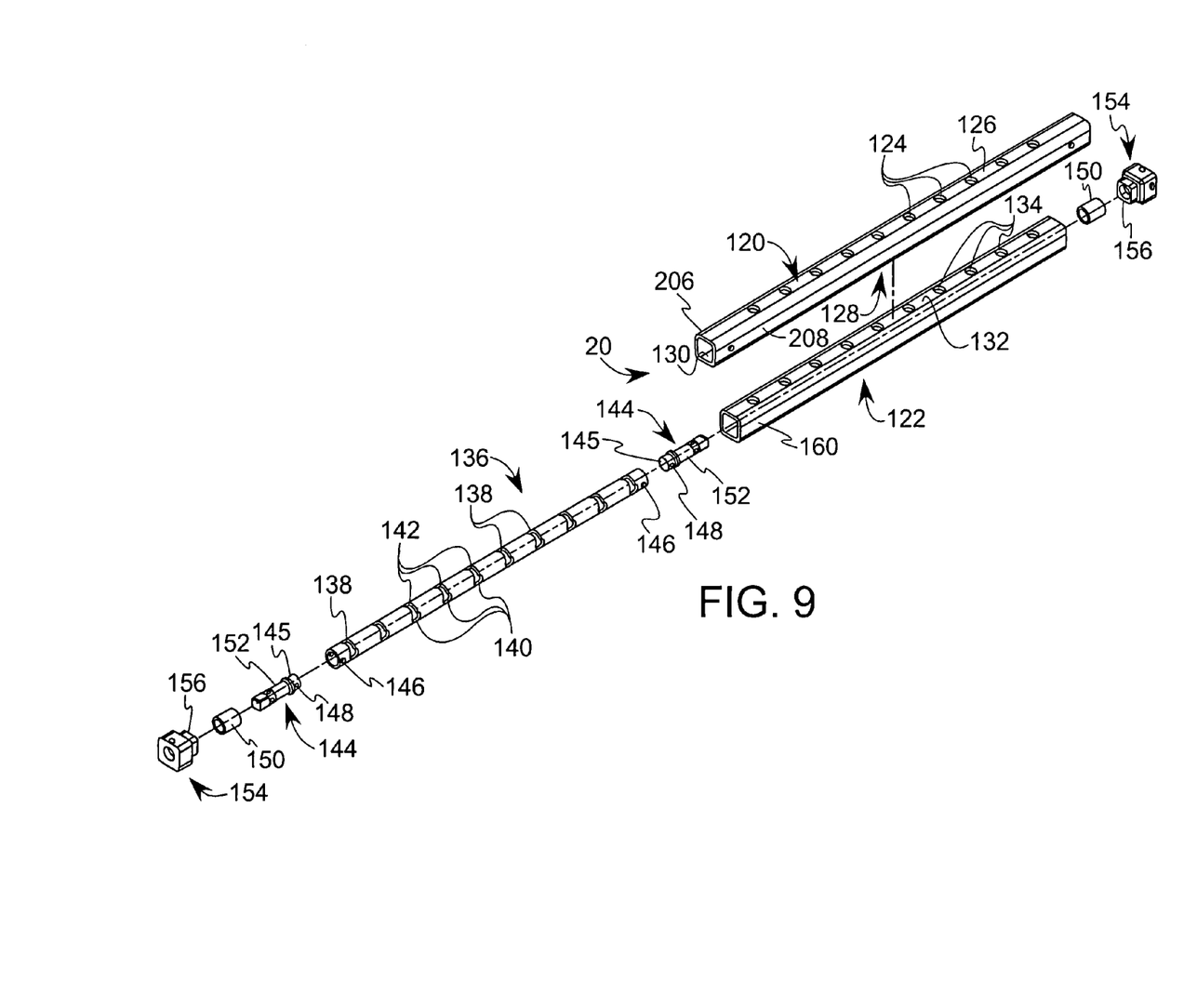
FIG. 9 is an exploded view of a blade support assembly.

Referring to FIGS. 3, 3A and 9, the blade support member 20 comprises a tubular upper member 120 rigidly attached, such as by welding, to a tubular lower member 122. The upper member 120 is illustrated as a square tubular member having a plurality of upper holes 124 in an upper support surface 126, and a plurality of lower holes 128 formed in a lower side 130 and aligned with the upper holes 124. The lower member 122 is illustrated as a square tubular member having an upper side 132 formed with a plurality of holes 134, and attached adjacent the lower side 130 of the upper member 120, with the holes 134 aligned with the upper and lower holes 124, 128 of the upper member 120. The holes 124, 128 and 134 have substantially the same diameter. The upper member 120 defines an inner circumference which is sized to fit over the output ends 56 of the output shafts 54 for mounting the support member 20 on the adjustment units 26, 28. The upper member 120 and output ends 56 are maintained in associated with each other by fasteners 131 extending through aligned holes 133 and 135 in the upper member 120 and output ends 56, respectively.

A locking member 136 is located within the lower member 122 and, in the present example, is illustrated as a tubular member of circular cross-section. The locking member 136 includes a plurality of openings 138 axially aligned with the holes 124, 128 and 134. The openings 138 are formed as key hole openings, where each opening comprises an enlarged, generally circular portion 140 having a diameter substantially similar to the diameter of the holes 124, 128 and 134. An elongate slot portion 142 is located extending circumferentially from each of the circular portions 140, where the slot portions 142 define a width less than the diameter of the circular portions 140.

Figures 10, 11, 12, 13:
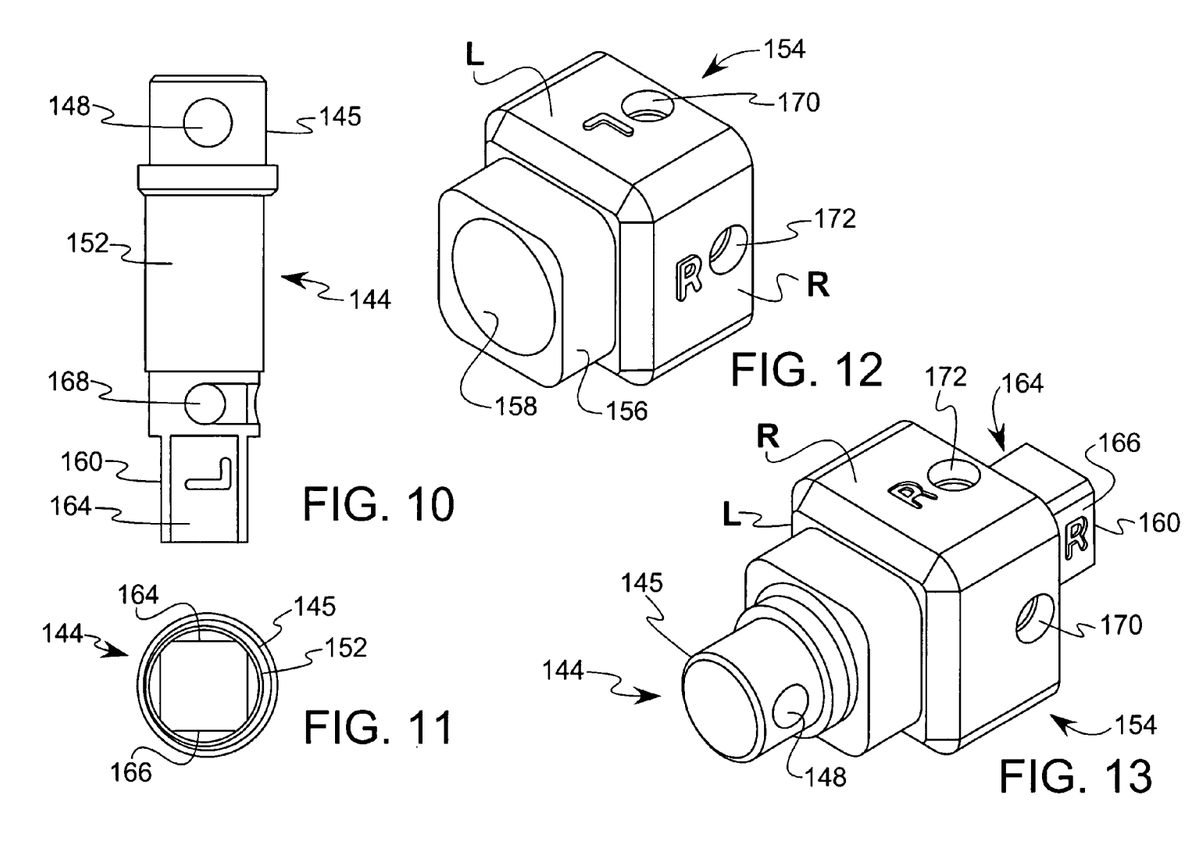
FIG. 10 is an elevational view of a cam pin for the blade support assembly.
FIG. 11 is an end view of the cam pin for the blade support assembly.
FIG. 12 is a perspective view of a bearing cap for the blade support assembly.
FIG. 13 is a perspective view of the cam pin located in the bearing cap for the blade support assembly.

Referring additionally to FIGS. 10 and 11, the locking member 136 is located for rotation within the lower member 122 by cam pins 144. The cam pins 144 have an inner end 145 located within respective ends of the locking member 136 and the cam pins 144 are held in place by pins (not shown) extending through holes 148 in the cam pins 144 and aligned holes 146 in the locking member 136. Bearings 150 are positioned over a central portion 152 of the cam pins 144, and the assembled cam pins 144 and bearings 150 are located within bearing caps 154 (FIGS. 12 and 13), where the cam pins 144 are rotatable relative to the bearing caps 154. The bearing caps 154 are shown as including generally square end portions 156 which are positioned within the ends of the lower member 122 to thereby provide support for the locking member 136.

Referring to FIG. 12, a bearing cap 154 is illustrated for use on either side of the support member 20. It can be seen that the end portion 156 defines a circular opening 158 through which the cam pin 144 passes. The opening 158 is offset relative to two adjacent sides of the bearing cap 154. Specifically, the position of the opening 158 is offset closer to a side L of the bearing cap 154 and is additionally offset closer to a side R of the bearing cap 154. When the bearing cap 154 is mounted in the left side of the lower member 122, the side L is positioned facing horizontally to the rear, i.e., adjacent a rear side 160, of the support member 122. When the bearing cap 154 is mounted in the right side of the lower member 122, the side R is positioned facing horizontally adjacent a rear side 160 of the support member 122. Thus, the openings 158 on the left and right side of the lower member 122 is offset toward the upper side 132 and the rear side 160 of the lower member 122.

Referring to FIG. 11, the central axis of the inner end 145 of each cam pin 144 is offset or eccentric relative to the central axis of the central portion 152 of the cam pin 144, such that rotation of the cam pin 144 within the opening 158 operates to move the inner end 145, and thus the locking member 136, in a direction transverse to an elongate axis of the locking member 136. Specifically, an outer end 162 of the cam pin 144 is rotatable through 90° of movement, which movement will move the locking member 136 in a transverse direction away from the upper side 132 of the lower member 122.

As seen in FIG. 12, the bearing cap 154 is preferably provided with an indicia indicating the side of the bearing cap 154 to be placed in the rearward facing position and thereby facilitate use of a common bearing cap 154 on either side of the lower member 122. For example, the side L of the bearing cap 154 may be provided with an "L" and the side R of the bearing cap 154 may be provided with an "R" as indicia indicating the proper orientation of the bearing cap 154 on the lower member 122. Similarly, in order to locate the eccentric inner end 145 of the cam pin 144 in the correct orientation within each respective bearing cap 154, opposing flat sides 164, 166 of the outer end 160 are provided with indicia. For example, the flat sides 164 and 166 may be provided with the indicia "L" and "R", where the left cam pin 144 is located with the "L" facing upwardly in a first, non-operational position and is located aligned with the "L" side of the bearing cap in a second, operational position of the cam pin 144 (see FIG. 13). Similarly, the cam pin 144 on the right side of the lower member 122 will be located with the "R" indicia facing upwardly in a first, non-operational position of the cam pin 144, and will be located aligned with the "R" side of the right side bearing cap 154 in a second, operational position of the cam pin 144.

The cam pin 144 is provided with a hole 168 located adjacent the outer end 160, where the cam pin hole 168 is aligned with one of two through holes 170 or 172 in the bearing cap 154 when the cam pins 144 have been rotated to the operational position on the left and right side, respectively, of the lower member 122. Further, when the cam pins 144 are located in the operational position, a blade locking pin 174 (FIG. 3) is inserted through the aligned holes 168 and 170 or 172 to lock the locking member 136 in the operational position.

Figure 14:
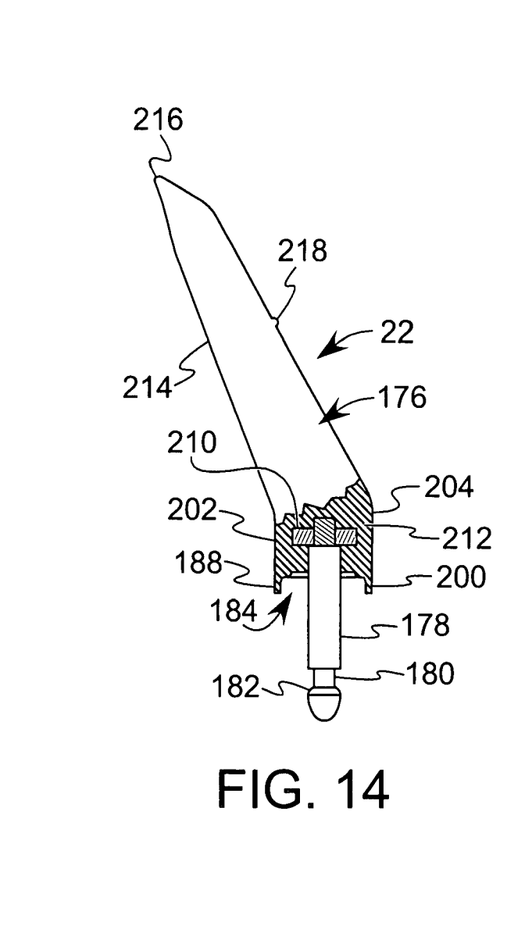
FIG. 14 is a side elevational view of a scalper blade.
Figure 15:
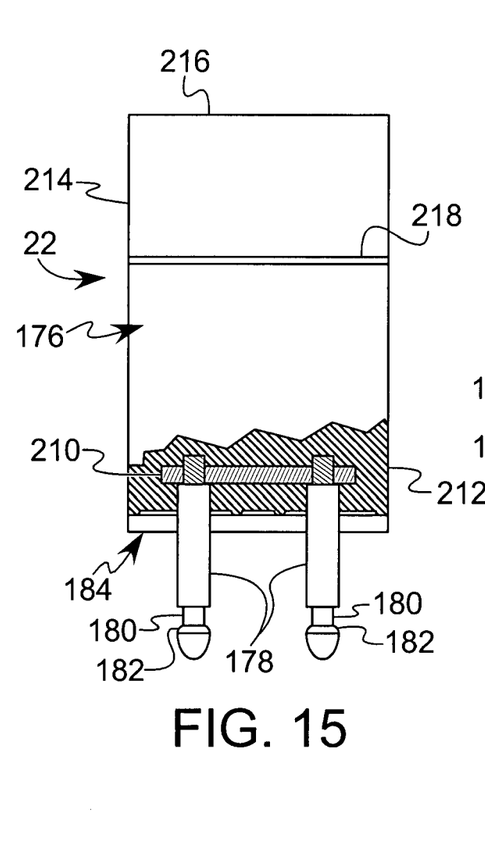
FIG. 15 is a rear elevational view of the scalper blade of FIG. 14.
Figure 16:
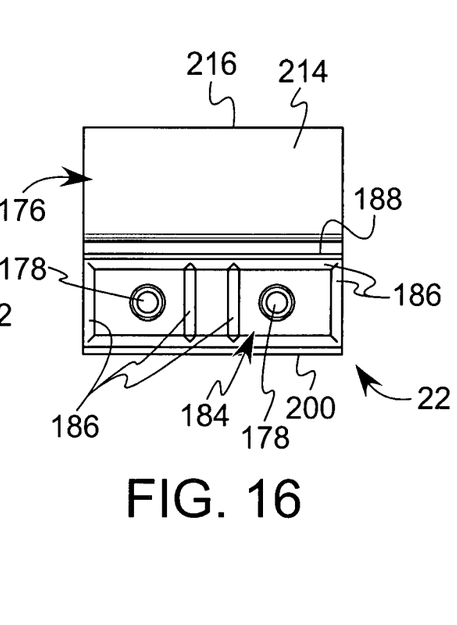
FIG. 16 is bottom plan view of the scalper blade of FIG. 14.

Referring to FIGS. 14–16, the scalper blades 22 each comprise a body 176 formed of an elastomeric material, preferably rubber, and elongate engagement members, illustrated as a pair of rigid metal engagement pins 178 extending from a lower side of the body 176. The engagement pins 178 are formed with a diameter which permits the pins 178 to pass in a close tolerance fit through the holes 124, 128 and 134 in the upper and lower members 120, 122 of the support member 20. The engagement pins 178 include a groove area 180 defining an upwardly facing land surface 182. Each scalper blade 22 is located on the support member 20 with a lower surface 184 of the scalper blade 22 positioned on the support surface 126 and lower ends of the engagement pins 178 extending into the locking member 136. In an installation operation for placing the scalper blades 22 on the support member 20, the locking member is rotated to position the generally circular portions 140 in alignment with the holes 124, 128 and 134, and insertion of the lower ends of the engagement pins 178 though the locking member 136 positions the groove areas 180 adjacent the circular wall of the locking member 136.

The elongate slot portions 142 of the locking member 136 define a width less than the diameter of the engagement pins 178, but large enough to permit passage of the groove areas 180 though the slot portions 142. The scalper blades 22 are locked in position by rotation of the cam pins 144 from the non-operational position to the operational position, causing the locking member 136 to rotate and engage the slot portions 142 of the locking member 136 with the groove areas 180 of the engagement pins 178, such that the land surfaces 182 face and engage an inner wall surface of the locking member 136 to prevent removal of the scalper blades 22 from the support member 20. The length of the openings 138 in the locking member is such that only approximately 90° rotation of the locking member 136 is permitted from the non-operational to the operational position. In addition, as rotation of the cam pins 144 also results in transverse movement of the locking member 136 away from the support surface 126, the lower surface 184 of each scalper blade 22 is drawn downwardly into tight engagement against the support surface 126.

It should be understood that the engagement pins 178 engage within the holes 124, 128 and 134 (see FIG. 3A) in a close tolerance fit to provide a structure for holding the engagement pins 178 at longitudinally spaced locations along the pins 178 for resisting lateral loads applied against the scalper blades 22 during use in association with the conveyor belt 16, which structure is separate from the structure of the locking member 136 for maintaining the blades 22 in engagement on the support member 20.

It should also be noted that the structure for locking the scalper blades 22 in place on the support member 20 enables all of the blades 22 to be locked or unlocked on the support member 20 simultaneously through movement of a single member, i.e., through rotation of the locking member 136. The present structure facilitates a reduction in maintenance time associated with installation and removal of the blades 22.

Referring to FIG. 16, the lower surface 184 of each scalper blade 22 is formed with seal portions comprising ribs 186 extending from the lower surface 184 for engaging and forming a seal around the engagement pins 178 and holes 124 in the upper surface 126. In addition, front and rear flaps or skirts 188, 200 extend from front and rear sides 202, 204 of the scalper blade 22 for engaging over front and rear side edges 206, 208 of the upper member 120. The ribs 186 and skirts 188, 200 function to seal out contaminants from entering the interior of the upper and lower members 120, 122 through the holes 124, and thereby protects the locking member 136 from being affected by contaminants.

The scalper blade body 176 includes a metal plate 210 located within a lower, base portion 212 of the body 176. The engagement pins 178 are attached to the plate 210, preferably by welding, and the plate 212 is molded within the base portion 212 during formation of the scalper blade 22 to provide a firm attachment structure between the engagement pins 178 and the elastomeric material of the blade 22.

An upper portion 214 of the scalper blade body 176 angles forwardly from the base portion 212, and the front and rear sides 202, 204 converge toward each other in a direction toward a blunt engagement edge 216. The base portion 212 is formed as a wide block-like structure, having the front and rear sides 202, 204 formed as substantially parallel vertical surfaces, for providing a generally rigid lower support for the elongated upper portion 214. In addition, the rear side 204 of the upper portion 214 includes an indicia, such as a rib 218, indicating a wear point on the scalper blade 22 when the blade 22 should be replaced.

In use, the adjustment units 26, 28 may be operated to pivot the scalper blade support member 20 forward, and to tension the scalper blades 22 against the conveyor belt 16. A predetermined torque force applied to the blades 22 through the support member 20 may be provided through the resilient couplings 48 which will elastically deform as tension in applied through the input shaft 40 to the output shaft 44. The resilient material of the blades 22 and the resilient material of the couplings 48 provide two resilient structures for absorbing shock loads applied to the blades 22.

In addition, when it is desired to provide maintenance to the blades 22, the pawl positioning lever 72 may be moved to the neutral position to permit free pivotal movement of the support member 20 away from the conveyor belt 16. It should also be noted that during maintenance involving release or locking of the blades 22 by the locking member 136, the pawls 62 may be located to a position engaging the gear 58 to limit the support assembly 20 to a stationary position and thereby facilitate application of a torque force for turning the locking member 136.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A scalper blade for mounting on a scalper blade assembly including a support member defining a support surface and passages for supporting the scalper blade in engagement with a conveyor belt, the scalper blade comprising:

a body portion formed of an elastomeric material, and comprising an upper portion and a lower portion;

the lower portion defining a base for the scalper blade, and including a rigid plate located within the lower portion; and at least one elongate engagement member extending through a lower surface of the lower portion and rigidly attached to the rigid plate for engagement in at least one passage in a support member.

2. The scalper blade of claim 1 wherein the engagement member includes a land surface extending generally perpendicular an elongate axis of the engagement member and facing upwardly toward the lower surface.

3. The scalper blade of claim 1 including seal portions extending outwardly from the lower surface for engaging the support surface and forming a seal around the engagement member.

4. The scalper blade of claim 1 wherein the upper portion includes opposing front and rear sides tapering from the base to an engagement edge, where the engagement edge is defined by a curved surface at the front side for engaging a conveyor belt.

5. The scalper blade of claim 1 wherein the lower portion includes front and rear sides and including skirts extending downwardly from the lower surface at the front and rear sides for engaging over sides of the support member.

* * * * *